United States Patent Office 3,239,445
Patented Mar. 8, 1966

3,239,445
SOLVENT DEWAXING WITH A POLYSTEARYL METHACRYLATE DEWAXING AID
Joseph J. Leonard, Alton, Ill., and Lyman E. Lorensen, Orinda, Calif., assignors to Shell Oil Company, New York, N.Y., a corporation of Delaware
No Drawing. Filed Aug. 6, 1962, Ser. No. 214,814
5 Claims. (Cl. 208—33)

This invention relates to the separation of oil and wax from wax-oil mixtures. More particularly, the invention relates to the use of a dewaxing aid to improve the efficiency of the separation of a wax from a wax-containing hydrocarbon oil.

In a conventional process for removing wax from oil, the wax bearing oil is dissolved in a solvent or solvent mixture at an elevated temperature and then the wax-oil-solvent solution is chilled to a sufficiently low temperature to effect precipitation or solidification of the wax. Following chilling, the precipitated wax is separated from the diluted oil by centrifuging, settling, or filtering. To a great extent, the capacity at which wax containing oil mixtures can be separated depends upon the rate of effectiveness of the filtration step.

In the past, many expedients have been employed to improve the effectiveness of filtration in wax-oil separation. One of the most common techniques in this field involves the employment of substances which are added to an oil and solvent mixture and which are known in the art as "wax modifiers," "wax conditioners," "wax separation aids," or "filtration aids". Vast numbers of compounds of widely varying chemical types have been investigated or utilized to prevent blocking of the filter by the wax crystals, increase rate of filtration, etc. Among the many addends which have been previously employed as filtration aids has been that class of substances generally referred to as pour point depressants. These materials, which may be naturally occuring or synthetically produced, function as filtration aids, presumably (although the exact theory is not well defined) based on an ability to modify the structure of wax crystals.

Recently, however, it has been discovered that while many of the well known pour depressants previously suggested as filtration aids have given some improvement, they have not proved entirely satisfactory and considerable difficulty in their use has been experienced for various reasons. Many of these wax separation aids are particularly ineffective when a haze-free oil is required to be produced, since the aid often results in a dewaxed oil which develops a haze on standing. Moreover, often the wax cake produced is not firm or dry in appearance, and is produced only after a relatively high solvent-to-oil ratio is employed and after relatively large amounts of the expensive pour depressant is used. Another drawback is the fact that certain wax modifying agents actually require the injection of certain types of waxy material to maintain good filtration rates. A further essential requirement, which many of the prior art processes employing filtration aids fail to possess, is the ability to maintain a low pressure differential across the wax filter cake while operating at constant filtrate flow rate.

All of the above problems are particularly acute when the mineral oil being refined is a residual high pour point lubricating oil. By a residual high pour point oil is meant a paraffin hydrocarbon mineral oil which contains some normal paraffinic waxes in the $C_{16}$ and higher carbon number range and more particularly those oils containing at least some normal paraffinic waxes of $C_{20}$ and higher carbon number components.

In accordance with the instant invention, applicants have discovered a process for solvent dewaxing a mineral oil which involves mixing a conventional dewaxing solvent and a polystearyl methacrylate, chilling the mixture to precipitate wax, and separating the wax from the oil. By employing the polystearyl methacrylate in conjunction with the dewaxing solvent the difficulties referred to in the preceding paragraphs are either obviated or minimized. It is particularly unexpected that such an outstanding result can be obtained since many closely related methacrylates fail to perform with any comparable high degree of effectiveness and efficiency. It has been discovered that when polystearyl methacrylates are employed in the solvent dewaxing process of the instant invention improved separability, filter rate, and yields of wax and oil are obtained. Particularly, the process results in a clear, substantially haze-free dewaxed oil being produced, and the process is one wherein a low pressure differential can be maintained across the wax filter cake at constant filtrate flow rate.

The use of the instant filtration aid has been found to produce a haze-free residual oil and to effect an increase in filtartion rate while using substantially lower proportions of the filtration aid than most previously known aids. It has also been found possible when using these filtration aids to reduce the ratio of dewaxing solvent to oil. These last two improvements result in the possibility of higher throughput in a given size of dewaxing plant, thus resulting in substantially greater efficiency. It has also been found that the use of the instant filtration aids result in a wax cake exhibiting improved washing characteristics due to the lower resistance offered by the cake to wash solvent flow. The result is an improved quality wax and an increase in dewaxed oil yield.

The particular polystearyl methacrylates employed as filtration or dewaxing aids in the instant process are compounds which may be prepared in any conventional way taught by the art for the polymerization of methacrylate esters. As specific examples of the preparation of the polystearyl methacrylate the following runs are reported.

EXAMPLE I 30 grams of stearyl methacrylate was charged to a 50 ml. glass pressure tube. Following the charge of monomer, .33 ml. of a catalyst solution composed of 1 gram of alpha,alpha'azodiisobutyronitrile in a 5 ml. solution of acetone was added. After bubbling $N_2(O_2$ free) through the solution for 10 minutes, the tube was closed and the mixture was placed in an oven kept at 65° C. After about 48 hours, a resinous, waxy, and somewhat brittle, white to tan colored substance was recovered after purification by precipitation from benzene with a 1 to 3 by volume mixture of acetone and methanol. This represented a yield of about 78%. The molecular weight of this substance was determined by the light scattering method and was about $.6-.8 \times 10^6$.

EXAMPLE II

An additional amount of monomer was polymerized under conditions similar to those set forth in Example I except that during this preparation only .0667 gram of the catalyst was employed, the reaction time was increased to 65 hours and the polymerization temperature was lowered to 40° C. A 67% yield was recovered of a resinous, off-white material having a molecular weight of from $4-6 \times 10^6$. When 1% by weight of this substance was dissolved in a white oil which has a viscosity at 100° F. of 16.53 centistokes and at 210° F. of 9.14 centistokes, the following viscosities of the blend were determined. The viscosity at 100° F. was 43.72 centistokes, and 210° F. was 9.14 centistokes.

Particularly desirable for the invention are polystearyl methacrylates having an average molecular weight from about 500 to $10 \times 10^6$, and more especially those from 2400 to 8×10⁶. The amounts of dewaxing aid which is employed vary depending upon the type of oil being dewaxed but generally range from about .005 to about .50% by weight of the waxy oil. The preferred range of polystearyl mechacrylate employed, however, is in the range of about .01 to about .4% by weight.

The particular dewaxing solvent employed may be any of those solvents conventionally employed in the art. Among those which may be suitable are the polar solvents, for example, ketones, such as methyl ethyl ketone, acetone, etc.; alcohols such as butyl, amyl, propyl alcohol, etc.; ethers such as diethyl ether, isopropyl ether, etc.; chlorinated hydrocarbons such as ethylene dichloride, trichloroethylene, etc.; mixtures of any one or more of the above solvents with an aromatic solvent such as benzene, toluene, etc. Particularly desirable as a dewaxing solvent or diluent are the low molecular weight hydrocarbons, such as ethane, propane, butane, isobutane, etc., and the one preferred for the process of the instant invention is propane.

In general, the amount of dewaxing solvent to be employed is that amount which keeps the oil in solution at the dewaxing temperature, but which does not dissolve an appreciable amount of wax. In the instant process, the proportions of solvent to wax containing feed stock may vary, but a preferred operating range is from about .5 volumes of solvent to about 4.5 volumes of wax containing mineral oils. Of course, proportions of dewaxing solvent to the waxy oil will depend upon the wax content of the oil, the viscosity of the oil and the temperature and other operating conditions of the dewaxing process.

The hydrocarbon charge stocks which may be utilized as the feed may be any wax containing mineral oil, but particularly desirable are feed stocks which contain at least some normal paraffinic waxes in the $C_{16}$ and higher carbon number range, and more particularly, those oils containing at least some normal paraffinic wax components of $C_{20}$ and higher carbon numbers.

Among the wax-oil feeds for which the present invention is applicable are short residue stocks which remain as a bottoms product from topped crude oils from which all lighter fractions up to and including distillate lubricating oil fractions have been removed. This includes, of course, residual oil stocks after they have been deasphalted and raffinates produced from the extraction of aromatic oils. Examples of desirable feeds are the conventional raffinates from a lube extraction plant such as a Sweet 95+ Bright Stock Raffinate, a Sweet 250 Raffinate, etc.

A preferred manner of practicing the invention comprises adding the polystearyl methacrylate to the waxy charge oil and then combining the modified oil with dewaxing solvent. Alternatively, the three components may be injected separately into a mixing device such as a pipeline or tank, or the oil and solvent may first be mixed after which the polymer may be added.

In order to ensure complete dispersal of the waxy oil in the dewaxing solvent it is generally desirable to heat the mixture to a temperature usually in the range of 115–195° F. Thereafter, the mixture is cooled such as by indirect heat exchange with water or cold filtrate oil (filtrate oil plus solvent) to a dewaxing temperature usually in the order of 0 to −45° F., dependent upon the specific wax and oil stock being treated. After precipitation of the wax by this procedure, the wax is then separated from the oil either by filtration or centrifuging. Subsequent to this, the wax is washed with the same or a different oil solvent for the purpose of removing oils still adhering to the wax particles. The solvent is then separated from oil either by simple flashing or by distillation.

In one embodiment of the invention 1.0 barrel per day of polystearyl methacrylate of a molecular weight of about .6–.8×10⁶ are combined with about 3200 barrels of a Sweet 92+ waxy hydrocarbon bright stock raffinate at a temperature of about 190° F. To this mixture are added about 10,500 barrels per day of liquified propane at about 90° F., the resulting mixture having a temperature of about 110° F.

The mixture is then passed through an indirect heat exchanger to give a mixture having a temperature of about 160° F. This mixture is then progressively cooled, first by indirect contact with cooling water and then by indirect heat exchange with cold oil solvent filtrate to a temperature of about 100° F. After which it is sent to a chiller and cooled to about −25° F. The chilled mixture is then transported to a filter where wax is removed and the dewaxed bright stock lubricating oil remaining dissolved in the propane is recovered. The crude wax is then washed on the filter with additional propane to recover further amounts of oil and to purify the residual wax. Approximately 350 barrels per day of the wax and about 2850 barrels per day of the dewaxed bright stock lubricating oil are recovered.

COMPARATIVE DATA

Comparative tests were made under the conditions similar to those described above using various waxy oil feeds to determine the relative efficiency and effectiveness of closely related methacrylate polymers and other filtration aid materials to the polystearyl methacrylates of the instant invention. The results clearly show the unexpected superiority of the filtration aids of the present invention and are set forth in Table I below:

*Table 1*

EVALUATION OF WAX FILTRATION AIDS IN PROPANE DEWAXING

| Additive | Solvent to Oil Ratio, Volume | 48 Hour Haze | Δ p.s.i.[1] |
|---|---|---|---|
| Sweet 95+ Bright Stock Raffinate-Low Carbon Residue: Polystearyl Methacrylate, percent w.: | | | |
| .02 | 4.0 | Pass | 4 |
| .06 | 4.0 | do | 2 |
| .10 | 4.0 | do | 5 |
| .04 | 4.0 | do | 2 |
| .01 | 4.0 | do | 3 |
| .005 | 4.0 | Fail | 23 |
| .20 | 4.0 | Pass | 3 |
| .50 | 4.0 | Fail | 30 |
| .02 | 3.0 | Pass | 10 |
| .03 | 3.0 | do | 7 |
| .04 | 3.0 | do | 2 |
| Compound X[2], percent w.: | | | |
| .10 | 3.0 | Fail | 22 |
| .10 | 4.0 | do | 32 |
| .10 | 4.5 | do | 24 |
| .15 | 3.0 | do | 10 |
| Compound Y[2], percent w.: | | | |
| .10 | 4.0 | Pass | 3 |
| .10 | 3.5 | Fail | 13 |
| .10 | 3.0 | do | 17 |
| Sweet 250 Raffinate: Polystearyl Methacrylate, percent w.: | | | |
| .03 | 2.0 | Pass | 1 |
| .016 | 2.0 | do | 2 |
| .01 | 2.0 | do | 2 |
| Compound X, percent w.: | | | |
| .01 | 2.0 | Fail | 25 |
| .05 | 2.0 | do | 32 |

[1] Maximum pressure differential across wax cake at constant filtrate flow rate.
[2] Contain estimated 30% w. active polymer.

Compound X is a polyalkylmethacrylate of the formula:

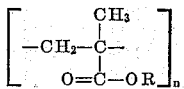

wherein R is predominantly a mixture of cetyl, lauryl and octyl groups.

Compound Y is a polyalkylmethacrylate of the same general formula wherein R is predominantly a mixture of lauryl and stearyl groups. These compounds are discussed in more detail in Canadian Patent No. 566,207, issued November 18, 1958.

Further data comparing polystearyl methacrylate to a commercially employed pour depressant is set out in Table II.

Table II

PLANT TEST OF POLYSTEARYL METHACRYLATE AS WAX CONDITIONER FOR PROPANE DEWAXING

|  | Sweet 92+ Bright Stock Raffinate | |
|---|---|---|
| Charge Stock: | | |
| Warm solution ratio (vol.) | 3.5 | 3.5 |
| Wash/charge ratio (vol.) | 0.79 | 0.79 |
| Terminal chill. temp., °F | −22 | −22 |
| 380 Wax injection, percent v | 3.0 | 0.0 |
| Conditioner type | ² PDA | PSM |
| Conditioner concentration, ¹ percent v | 0.220 | 0.056 |
| Dewaxed Oil Properties: | | |
| Pour point, °F | 15 | 10 |
| 48-hour haze test | Pass | Pass |
| Room temperature haze test | Pass | Pass |
| Wax Properties: | | |
| Specific gravity | 0.927 | 0.927 |
| Melting point, °F | 160.0 | 162.0 |
| Needle penetration at 77°F | 35 | 39 |
| Color, CP | Pass | Pass |
| Oil content, percent w | 3.0 | 3.1 |

¹ PSM concentration shown is 55 percent w. polystearyl methacrylate, 45 percent w. HVI 100 neutral.
² PDA is a commercial pour point depressant.

Obviously, many modifications and variations of the present invention are possible in the light of the above teachings. It is, therefore, to be understood that the invention may be practiced otherwise than as specifically hereinbefore described.

We claim as our invention:

1. A process for solvent dewaxing a mineral oil comprising mixing said oil with a dewaxing solvent and from .005 to .50% by weight of polystearyl methacrylate homopolymer having an average molecular weight of 500 to $10 \times 10^6$, chilling the mixture to precipitate wax, passing said mixture to a filter whereby the precipitated wax is separated from the oil.

2. A process for dewaxing a lubricating oil stock containing at least some normal paraffinic waxes, having at least 16 carbon atoms which comprises mixing said oil with a dewaxing solvent and from .005 to 0.50% by weight based on the oil of polystearyl methacrylate homopolymer having an average molecular weight of from 500 to $10 \times 10^6$, chilling the mixture to cause precipitation of wax, and separating said wax from the oil.

3. A process for dewaxing a lubricating oil stock containing at least some normal paraffinic waxes having at least 16 carbon atoms which comprises mixing said oil with about .5 to about 4.5 volumes of propane based on the oil and from .01 to .4% by weight based on the oil of polystearyl methacrylate homopolymer having an average molecular weight of from 2400 to $8 \times 10^6$ chilling the mixture to cause precipitation of wax, and separating the latter from the oil.

4. A dewaxing process comprising mixing a sweet 95 bright stock raffinate mineral oil with from about 3 to about 4 volumes of propane per volume of said oil and from about .01 to about .2% by weight based on said oil of polystearyl methacrylate homopolymer having a molecular weight of about $.4-.6 \times 10^6$, chilling the mixture to cause precipitation of wax, and separating said wax from the oil.

5. A dewaxing process comprising mixing a sweet 250 raffinate mineral oil with about 2 volumes of propane per volume of said oil and from about .01 to about .03% by weight based on said oil of polystearyl methacrylate homopolymer having a molecular weight of about $.4-.6 \times 10^6$, chilling the mixture to cause precipitation of wax, and separating said wax from the oil.

References Cited by the Examiner

UNITED STATES PATENTS 2,782,142   2/1957   DeVault _____ 208—33

DELBERT E. GANTZ, *Primary Examiner.*

ALPHONSO D. SULLIVAN, *Examiner.*